United States Patent [19]

Yoshii et al.

[11] Patent Number: 5,448,356
[45] Date of Patent: Sep. 5, 1995

[54] DETECTING DEVICE USING A SEMICONDUCTOR LIGHT SOURCE EMITTING AT LEAST ONE LASER BEAM IN AT LEAST ONE PREDETERMINED DIRECTION

[75] Inventors: Minoru Yoshii, Tokyo; Hiroyasu Nose, Zama; Seiji Takeuchi, Kawasaki, all of Japan

[73] Assignee: Canon Kabushiki Kaisha, Tokyo, Japan

[21] Appl. No.: 9,731

[22] Filed: Jan. 27, 1993

[30] Foreign Application Priority Data

Jan. 31, 1992 [JP] Japan .................. 4-046263

[51] Int. Cl.⁶ .............................................. G01B 9/02
[52] U.S. Cl. ............................. 356/356; 250/237 G
[58] Field of Search ................. 356/356, 358, 354; 250/237 G

[56] References Cited

U.S. PATENT DOCUMENTS

| | | | |
|---|---|---|---|
| 4,842,408 | 6/1989 | Yoshii et al. | 356/349 |
| 5,068,530 | 11/1991 | Ieki et al. | 250/237 |
| 5,194,745 | 3/1993 | Takamiya | 356/28.5 |
| 5,272,512 | 12/1993 | Kadowaki et al. | 356/28 |

FOREIGN PATENT DOCUMENTS

| | | |
|---|---|---|
| 0390092 | 10/1990 | European Pat. Off. |
| 0423513 | 4/1991 | European Pat. Off. |
| 0451780 | 10/1991 | European Pat. Off. |
| 3728568 | 3/1989 | Germany |

*Primary Examiner*—Samuel A. Turner
*Attorney, Agent, or Firm*—Fitzpatrick, Cella, Harper & Scinto

[57] ABSTRACT

A device for detecting the displacement of an object is provided with a semiconductor laser having an active layer for emitting laser beams in two directions, mirrors for directing the laser beams toward a diffraction grating provided on the object, and a detector for receiving the interfering lights diffracted by the diffraction grating. The active layer of the semiconductor laser is arranged substantially parallel to the diffraction grating, to save space, also to enable light deflection such that the spreading direction of the light beams from the semiconductor laser coincides with the direction of pitch of the diffraction grating. The diffraction grating is irradiated with an improved efficiency, giving diffracted lights with higher intensity to the detector and improving the S/N ratio of detection. The space between the semiconductor laser and the object is reduced, thus reducing the entire volume of system.

16 Claims, 5 Drawing Sheets

DETECTING DEVICE USING A SEMICONDUCTOR LIGHT SOURCE EMITTING AT LEAST ONE LASER BEAM IN AT LEAST ONE PREDETERMINED DIRECTION

BACKGROUND OF THE INVENTION

1. Field of the Invention

The present invention relates to a detecting device, adapted for use in a displacement detecting apparatus for non-contact measurement of the amount of displacement of a moving object (such as a stage, a belt, paper or fluid) or the moving velocity thereof, either by irradiating the moving object with a laser beam and detecting the variation in frequency of scattered light subjected to Doppler's shift according to the moving velocity of the moving object, or by introducing a coherent light beam into a diffraction grating on a movable scale mounted on the moving object, causing interference between the lights of specified orders of diffraction diffracted by the diffraction grating, to form interference fringes and counting the number of interference fringes.

2. Related Background Art

In the field of detecting devices for non-contact and precise measurement of the moving velocity of the moving object, there are known active systems and passive systems.

Figure 1:
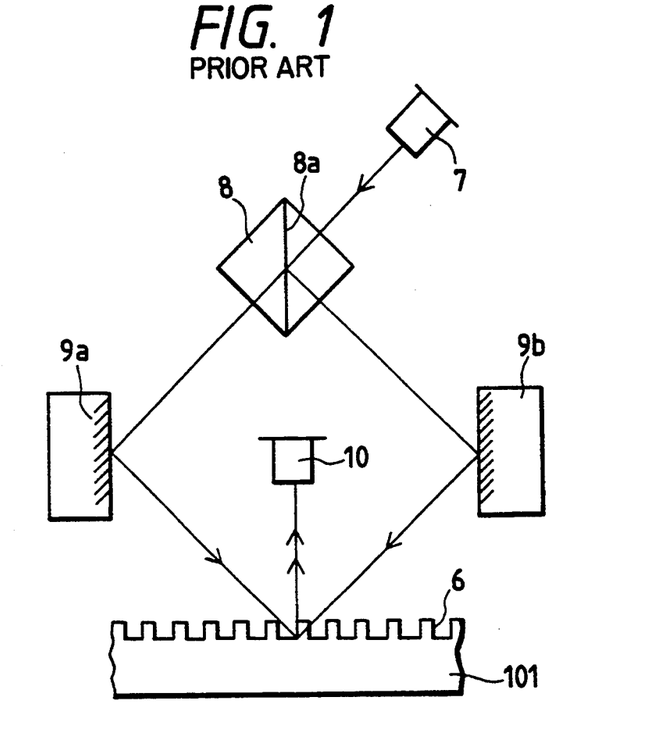
FIG. 1 is a partial schematic view of a conventional linear encoder.

As the displacement detector of the active system, there is already known a linear encoder utilizing the diffraction grating interference, as shown in FIG. 1.

Referring to FIG. 1, a coherent light beam from a laser 7 is converted into a substantially parallel beam by a collimating lens (not shown), and introduced into a beam splitter 8 by which the beam is split at a face 8a into a transmitted light beam and a reflected light beam. The two light beams from the beam splitter 8 are respectively reflected by mirrors 9a, 9b and introduced into a diffraction grating 6 on a moving object 101 in such a manner that ±m-th order diffracted lights from the diffraction grating 6 are emitted substantially perpendicularly thereto.

More specifically, the split light beams are so introduced as to satisfy a condition:

$$\theta_m = \sin^{-1}(m\lambda/P)$$

wherein P is pitch of the diffraction grating 6, $\lambda$ is wavelength of the coherent light beams, m is an integer, and $\theta_m$ is the incident angle of the coherent light beams into the diffraction grating 6. Thus, the ±m-th order diffracted lights, emerging substantially perpendicularly from the diffraction grating 6 are superposed and guided to detection means 10.

Thus, the detection means 10 detects the interfered lights, or the pulses indicating the number of interference fringes corresponding to the moving state of the diffraction grating 6.

The linear encoder shown in FIG. 1 detects the moving state, such as the moving velocity or moving direction, of the moving object 101, utilizing thus detected pulses.

Such displacement detector of an active system is capable of highly precise detection of a submicron change in position, but it is difficult to construct such a detector smaller than a cube with dimensions of several centimeters, because a semiconductor laser and mirrors are involved in the configuration.

Figure 2:
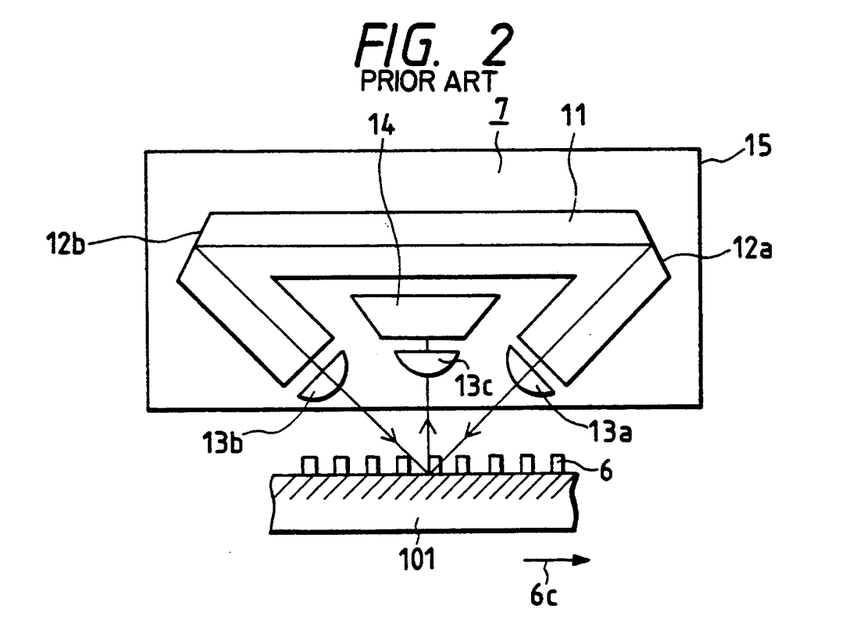
FIG. 2 is a partial schematic view of a device in which the components of FIG. 1 are integrated.

FIG. 2 is a schematic view when the displacement detector is miniaturized by integration of the components shown in FIG. 1. In FIG. 2 there are shown an active layer 11 of a semiconductor laser, mirrors 12a, 12b, lenses 13a, 13b, 13c for converting the laser beam into plane wave, a diffraction grating 6, and detection means 14. The working principle is same as in the device shown in FIG. 1.

In the detector shown in FIG. 2, the active layer 11 of the semiconductor laser 7 is parallel to the plane of the drawing, and the light-receiving face of the detection means 14 is formed parallel to the plane of the drawing.

Such configuration is difficult for miniaturization, because of a large number of components.

Also in such configuration, the laser beam emitted from the semiconductor laser spreads more in a direction perpendicular to the plane of the drawing, but less in a direction parallel to the plane of the drawing.

Figure 3:
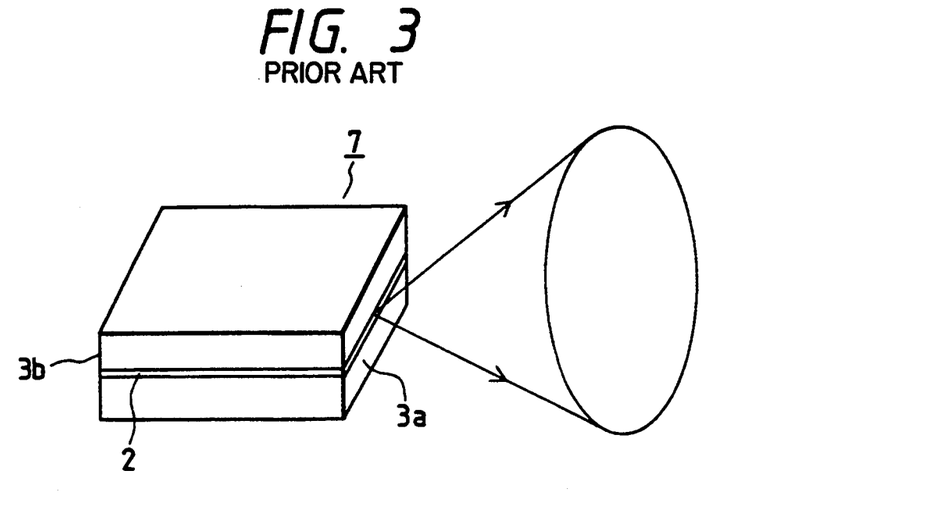
FIG. 3 is a schematic view showing the relation of the active layer of a semiconductor laser and the light beam emitted therefrom.

FIG. 3 is a schematic view of the laser beam emitted from the active layer of the semiconductor laser. The dimension of the active layer 2, in a cross section perpendicular to the beam emitting direction, is usually less than a micron in the direction of thickness and several microns in the lateral direction. Therefore, because of diffraction, the laser beam spreads more in the direction perpendicular to the active layer (direction of thickness) and less in the direction parallel thereto, rather inversely to the cross sectional shape of the active layer.

For this reason, in the displacement detector shown in FIG. 2, the light beam spreads significantly in the direction perpendicular to the plane of the drawing and overflows the width of diffraction grating 6, perpendicular to the direction 6c of pitch, thereby resulting in a lowered diffraction efficiency.

In order to suppress such spreading of the laser beam, it has been conceived to provide the configuration shown in FIG. 2 with a refractive power in the direction perpendicular to the plane of the drawing, but the means for providing such refractive power is very difficult to produce in practice.

SUMMARY OF THE INVENTION

An object of the present invention is to provide a detecting device in which the position of the active layer of the semiconductor laser is suitably selected, thereby achieving a compact structure.

Another object of the present invention is to provide a detecting device capable, in the detection utilizing a diffraction grating, of improving the light receiving efficiency of light energy, thereby improving the detection sensitivity of the object information and enabling highly precise detection.

Still other objects of the present invention, and the features thereof, will become fully apparent from the following description of embodiments of the present invention.

DETAILED DESCRIPTION OF THE PREFERRED EMBODIMENTS

A displacement detecting device of the following embodiments for obtaining the information on the displacement of an object by introducing coherent light beams from a semiconductor laser onto said object, causing two light beams obtained from the object to interfere with each other, and detecting the interfering light beams with detecting means to obtain a signal usable for determining the information, is characterized in that the semiconductor laser is so positioned that the face of the object is substantially parallel to the active layer of the semiconductor laser, that the two light beams are those emitted in two directions from the face of the active layer of the semiconductor laser, and that means for directing the two light beams toward the face of the object is provided.

In particular, the embodiments are respectively featured in that the two light beams are emitted in a direction substantially parallel to the direction of pitch of a diffraction grating provided on the object and respectively reflected by mirrors for entry into said diffraction grating, that the two light beams are introduced with a same incident angle in a same position on the face of the object, that the detection means is adapted to detect the diffracted lights of a particular order of diffraction, diffracted by the diffraction grating provided in relation to the object, and that the detection means is adapted to detect the scattered light from the object.

Figure 4:
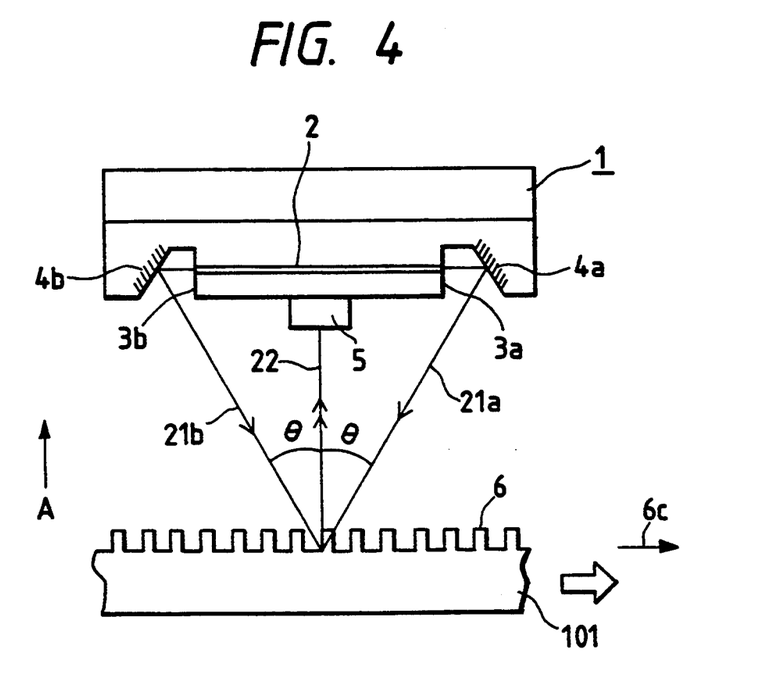
FIG. 4 is a partial schematic view of a first embodiment of the present invention.
Figure 5:
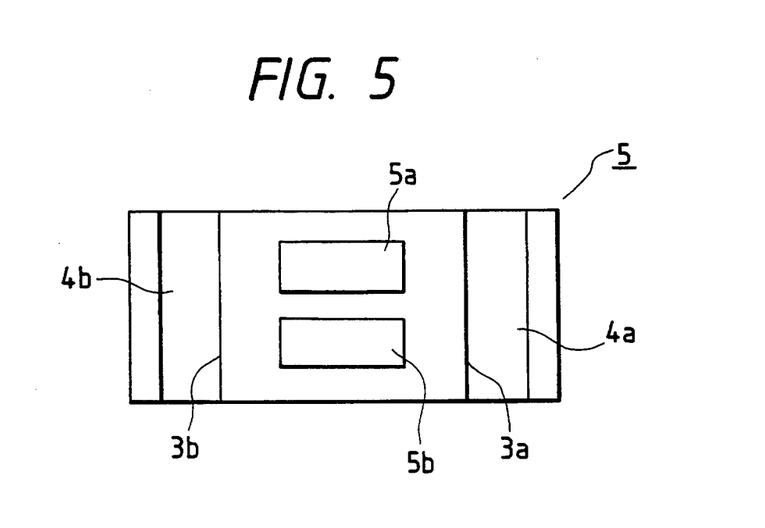
FIG. 5 is a schematic view of the device shown in FIG. 4, seen from a direction A.
Figure 6:
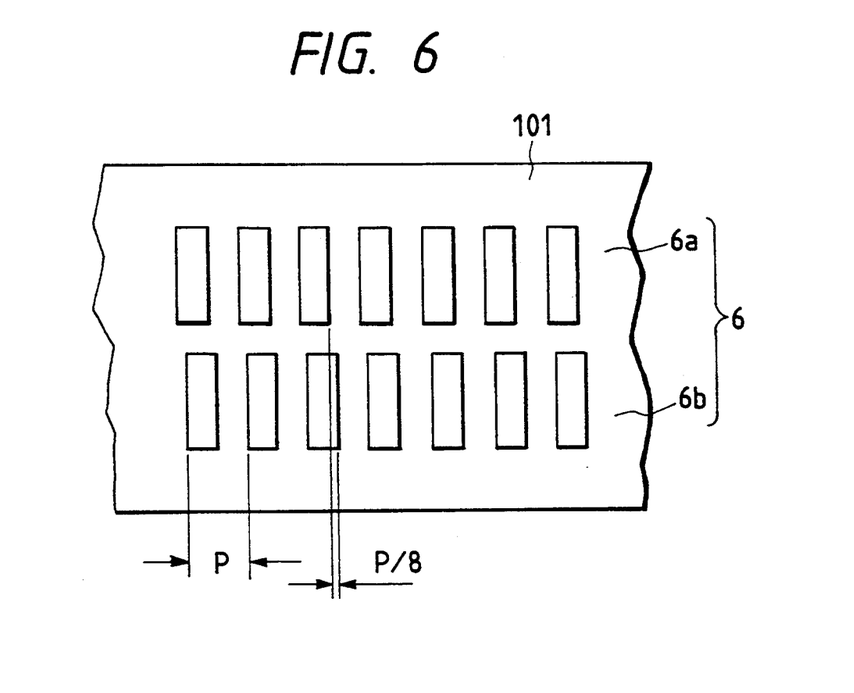
FIG. 6 is a partial magnified view of the device shown in FIG. 4.

FIG. 4 is a partial schematic view of a first embodiment of the present invention, FIG. 5 is a view of the device shown in FIG. 4, seen from a direction A, and FIG. 6 is a schematic view of a diffraction grating 6 shown in FIG. 4.

Referring to FIG. 4, there are shown a semiconductor laser 1; an active layer 2 thereof; mirrors 4a, 4b for deflecting laser beams generated from the active layer 2, to a spatial point; a diffraction grating 6 provided on a moving object 101 and having a periodic structure; and detection means 5 for receiving the light diffracted by the diffraction grating 6.

The plane of the active layer 2 is positioned substantially parallel to the plane of the diffraction grating 6. Also, the light-receiving face of the detection means 5 is positioned substantially parallel to the plane of the active layer 2 of the semiconductor laser 1. Also the mirrors 4a, 4b are so positioned that two laser beams therefrom intersect in a plane perpendicular to the plane of the active layer 2.

As shown in FIG. 6, the diffraction grating 6 is provided with two grating portions 6a, 6b of a same pitch P, positioned parallel to the direction of detection of displacement with the phase deviation of ⅛ of the pitch in the direction of the pitch.

The detection means 5 is provided, as shown in FIG. 5, with two detection portions 5a, 5b, respectively corresponding to the two diffraction grating portions 6a, 6b of the diffraction grating 6.

The function of the present embodiment will be explained in the following.

Excitation of the active layer 2 of the semiconductor laser 1 generates photons, of which a part repeatedly reciprocates in the active layer 2 by resonance oscillators 3a, 3b. In this process, there is induced photoamplification, and a part of the photons is emitted as laser beams through the oscillators 3a, 3b. The laser beams are emitted from both sides of the active layer 2, as beams 21a, 21b which are reflected by the mirrors 4a, 4b toward a spatial point where the diffraction grating 6 is positioned.

Such arrangement dispenses with the beam splitter, and is compact, since the active layer is parallel to the diffraction grating so that the space required in a direction perpendicular to the light-receiving face is small. In this arrangement, the light beams spread greatly in a direction perpendicular to the active layer 2, or in the plane of drawing of FIG. 4, or in the direction of pitch of the grating 6, indicated by an arrow 6c.

Consequently, the light beams do not extend beyond the diffraction grating, efficiently enter the diffraction grating, and are diffracted thereby. Thus, there is obtained an increase in the diffracted light (signal light), leading to an increase in the light beams entering the detection means, and improvements in the light-receiving efficiency and in S/N ratio, whereby the accuracy of detection is improved.

In the present embodiment, the light beam introduction from the mirrors 4a, 4b into the diffraction grating 6 is conducted in such a manner that m-th order diffracted lights from the grating 6 emerge substantially perpendicularly from the grating 6.

More specifically, said introduction is so conducted as to satisfy a condition:

$$\theta_m \cong \sin^{-1}(m\lambda/P) \quad (1)$$

wherein P is pitch of the diffraction grating 6, λ is wavelength of the coherent light beams, m is an integer, and $\theta_m$ is an incident angle of the coherent light beams to the grating 6.

Two diffracted lights of ±m-th order, emerging substantially perpendicularly from the diffraction grating 6, are superposed to enter the detection means 5. The light-receiving face of the detection means 5 is positioned perpendicular to the entering light beams, thereby improving the efficiency of light reception.

In the present embodiment, in response to a displacement of the diffraction grating 6 by Δx in the direction 6c, the phase of the diffracted light of the beam 21a is advanced by:

$$\Delta\phi = 2m\pi \cdot \Delta x/P$$

and the phase of the diffracted light of the beam 21b is delayed by the same amount.

Thus, in the present embodiment, in response to a displacement of the diffraction grating by a pitch, the phase of the m-th order diffracted light varies by 2 mπ. Since the detection means 5 detects the interference of the light beams subjected to ±m-th order diffraction, 2 m sinusoidal signals are obtained in response to a displacement of the diffraction grating by a pitch.

As an example, in case of utilizing a diffraction grating 6 with a pitch of 3.2 μm and the 1st-order diffracted lights (m=1), two sinusoidal signals are obtained in the detection portions 5a, 5b of the detection means 5 in response to a displacement of 3.2 μm of the grating 6. Consequently, the resolution per one sinusoidal wave is equal to a half of the pitch of the grating 6, or 3.2/2=1.6 μm. The two sinusoidal wave signals thus obtained are processed, in an unrepresented signal processing unit, in known manner to obtain the amount and direction of displacement.

As explained in the foregoing, in the present embodiment, the plane of the active layer 2 and the light-receiving face of the detection means 5 are positioned in parallel with each other on a single chip.

The light beams are emitted to a space perpendicular to the active layer 2, whereby the diffraction grating 6 is efficiently irradiated by the light beams, and the resulting diffracted lights are also efficiently received by the detection means 5. As a result, a high S/N ratio is attained and the information on the displacement of the moving object 101 is detected with high accuracy. In addition the device can be miniaturized by the substantially parallel arrangement of the active layer and the diffraction grating.

Furthermore, the grating 6 is composed of two grating portions 6a, 6b as shown in FIG. 6, and the diffracted lights therefrom are respectively detected by two detection portions 5a, 5b of the detection means 5 to obtain two signals having a difference of ¼ of a cycle, in order to determine the moving direction of the moving object 101 (diffraction grating 6).

Figure 7:
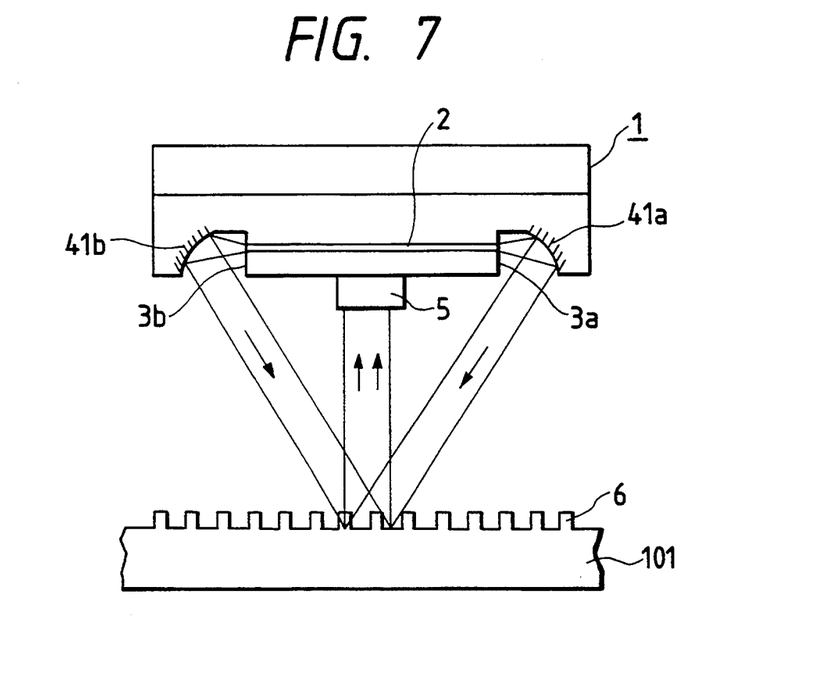
FIG. 7 is a partial schematic view of a second embodiment of the present invention.
Figure 8:
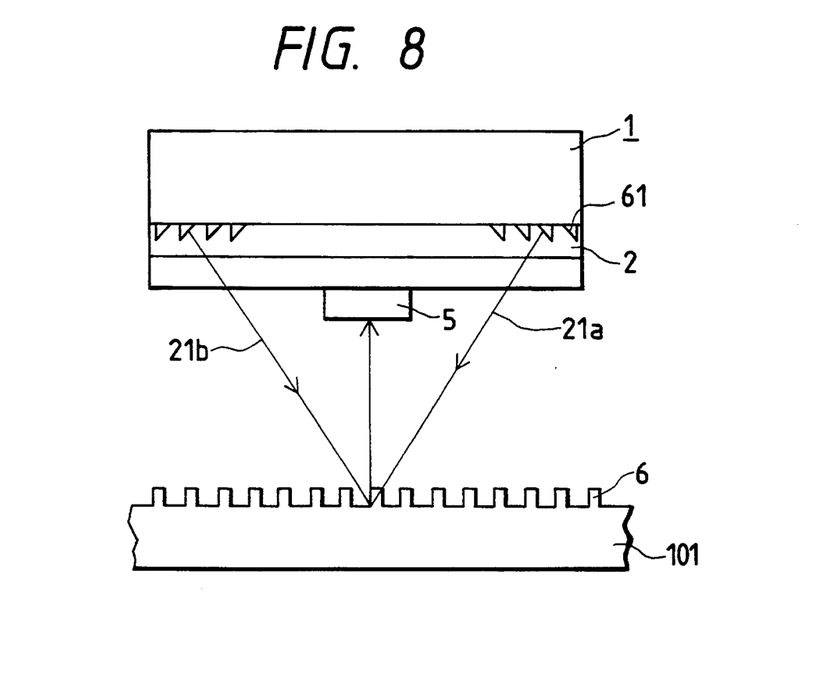
FIG. 8 is a partial schematic view of a third embodiment of the present invention.
Figure 9:
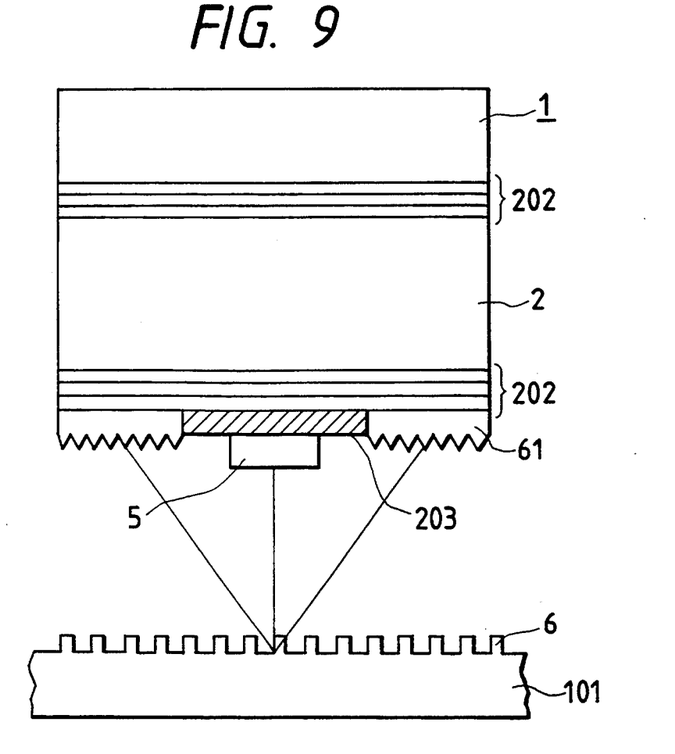
FIG. 9 is a partial schematic view of a fourth embodiment of the present invention.

FIGS. 7, 8 and 9 are partial schematic views of second, third and fourth embodiments of the present invention, wherein same components as those in FIG. 4 are represented by same numbers.

In the second embodiment shown in FIG. 7, the light beams spreading in a direction perpendicular to the plane of the active layer 2 of the semiconductor laser 1 are converted into substantially parallel beams by curved mirrors 41a, 41b, thereby preventing generation of unnecessary interference fringes on the detection means 5. Thus, prevented is a loss in contrast of the interference fringes providing the desired signals, and the S/N ratio is improved. Except for these points, the present embodiment is same as that shown in FIG. 4.

The third embodiment shown in FIG. 8 is same as the first embodiment shown in FIG. 4, except that a diffraction grating 61 for light beam emission is provided in the active layer 2 of the semiconductor laser 1, whereby two light beams 21a, 21b emitted from the active layer 2 through said diffraction grating 61 intersect at a spatial point perpendicular to the plane of the active layer.

In the fourth embodiment shown in FIG. 9, there is employed, as the semiconductor laser, a planar emission laser which emits the light in the direction of thickness of the active layer 2. Resonance oscillators 202 include laser oscillation in the direction of thickness. The emitted light beams are diffracted by a diffraction grating 61 in a similar manner as in FIG. 8, toward a point on the diffraction grating 6.

A shielding face 203 prevents the laser beam from irradiating the detection means 5 from the rear thereof. Except for these points, the present embodiment is same as the first embodiment shown in FIG. 4.

Figure 10:
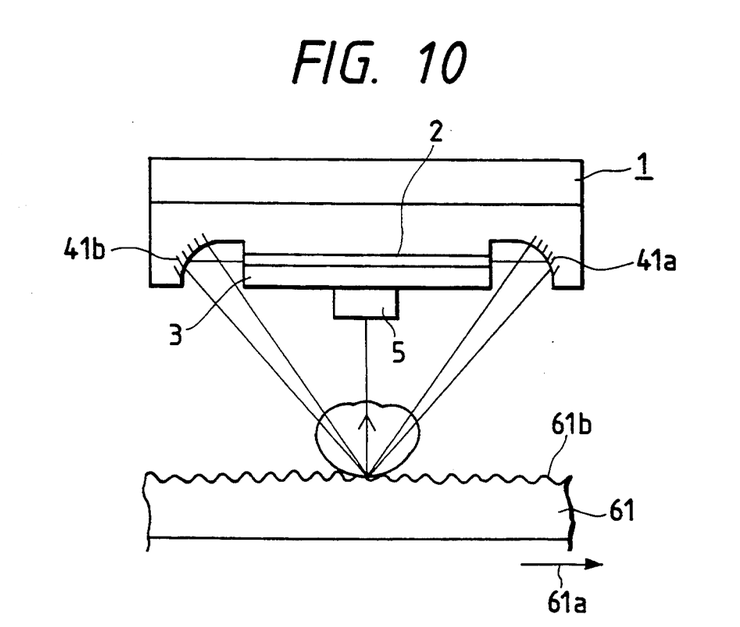
FIG. 10 is a partial schematic view of a fifth embodiment of the present invention.

FIG. 10 is a partial schematic view of a fifth embodiment of the present invention.

This embodiment shows an application of the displacement detector in a Doppler velocimeter. The basic configuration is same as that of the second embodiment shown in FIG. 7, except that the light beams from the mirrors 41a, 41b are respectively condensed and intersect in the vicinity of a scattering face (coarse face) 61b of the moving object 61.

The laser beams emitted from a laser 1 are reflected by the mirrors 41a, 41b and irradiate, from different directions, with a same incident angle θ, the moving object 61 moving with a velocity V in a direction 61a. The light scattered by the moving object 61 is detected by the detection means 5. The frequency of the scattered lights, resulting from two light beams, is subjected to Doppler shifts of $+\Delta f$, $-\Delta f$ in proportion to the moving velocity V.

The frequency change Δf can be represented by;

$$\Delta f = V \cdot \sin(\theta)/\lambda \qquad (3)$$

wherein λ is wavelength of the laser beams.

The scattered lights subjected to the Doppler shifts of $+\Delta f$, $-\Delta f$ interfere to generate dark-bright alternations on the detection means 5, with a frequency F given by:

$$F = 2 \cdot \Delta f = 2 \cdot V \cdot \sin(\theta)/\lambda \qquad (3)$$

The Doppler frequency F of the signal obtained in the detection means 5 is measured, and the moving velocity V of the moving object 61 is determined according to the equation (3).

Also, in this configuration, miniaturization is achieved by arranging the scattering face and the active layer in substantially parallel manner.

As explained in the foregoing embodiments, the configuration of the device can be miniaturized by a suitable arrangement between the plane of the active layer of the semiconductor layer and the light-receiving face of the detection means. Also, an arrangement in which the spreading direction of the light beams coincides with the direction of pitch of the diffraction grating causes the receiving efficiency for light energy to increase, thereby improving the detection sensitivity for the information on the displacement of the moving object, and realizing a displacement detecting device capable of highly precise detection.

What is claimed is:

1. A device for detecting information on an object to be measured, comprising:

a semiconductor laser light source having a laser structure including an active layer a boundary surface of which is arranged substantially parallel to a face to be detected of said object and adapted to emit laser beams in at least two directions;

optical elements of directing respectively said laser beams, emitted in at least two directions from said active layer, toward said face to be detected; and a detection system for receiving light from said face, irradiated by the laser beams directed by said optical elements, wherein the information of said object is detected by the light received by said detection system.

2. A device according to claim 1, wherein said optical elements are adapted to direct said laser beams to a diffraction grating provided on said face to be detected in such a manner that the longitudinal direction in the cross section of each of said laser beams from said active layer substantially coincides with the direction of pitch of said diffraction grating, and said detection system is adapted to receive lights diffracted by said diffraction grating.

3. A device according to claim 1, wherein said optical elements are adapted to direct said laser beams to a diffraction grating provided on said face to be detected, and said detection system is adapted to receive lights diffracted by said diffraction grating.

4. A device according to claim 1, wherein said semiconductor laser light source is arranged in such a manner that the laser beam, emitted in substantially opposite directions from both ends of said active layer, are emitted in directions substantially parallel to said face to be detected.

5. A device according to claim 1, wherein said optical elements have at least two reflecting faces for respectively reflecting said laser beams emitted in at least two directions from said active layer.

6. A device according to claim 1, wherein said optical elements are adapted to direct the laser beams, emitted from said active layer, to a substantially same position on the face to be detected, and said detection system is adapted to receive lights from said substantially same position.

7. A device according to claim 1, wherein said optical elements are adapted to introduce the laser beams, emitted from said active layer, to the face to be detected with substantially same incident angles.

8. A device according to claim 1, wherein said detection system is adapted to receive lights scattered by said face to be detected, irradiated by the laser beams directed by said optical elements.

9. A device according to claim 1, wherein the information on displacement of said object is detected by the light received by said detection system.

10. A device according to claim 9, wherein said information on displacement is amount and/or direction of displacement.

11. A device according to claim 9, wherein said information on displacement is velocity of displacement.

12. A device according to claim 1, wherein said semiconductor laser light source, said optical elements and said detection system are integrated in one structure.

13. A device according to claim 1, wherein said detection system includes at least one photosensor provided at the side, facing the face to be detected, of the semiconductor laser light source.

14. A device for detecting information on an object, comprising:
  a semiconductor laser light source having a laser structure including an active layer a boundary surface of which is arranged substantially parallel to a face to be detected of said object and adapted to emit at least one laser beam;
  an optical element for directing said at least one laser beam, emitted from said active layer, toward said face to be detected; and
  a detection system for receiving light from said face to be detected, irradiated by said at least one laser beam directed by said optical element, wherein the information on said object is detected by the light received by said detection system.

15. A device according to claim 14, wherein said optical element is adapted to direct said at least one laser beam to a diffraction grating provided on said face to be detected, in such a manner that the longitudinal direction in the cross section of said at least one laser beam from said active layer substantially coincides with the direction of pitch of said diffraction grating, and said detection system is adapted to receive light diffracted by said diffraction grating.

16. A device according to claim 14, wherein the information on displacement of said object is detected by the light received by said detection system.

* * * * *

UNITED STATES PATENT AND TRADEMARK OFFICE
CERTIFICATE OF CORRECTION

PATENT NO. : 5,448,356
DATED : September 5, 1995
INVENTOR(S) : MINORU YOSHII ET AL.

It is certified that error appears in the above-indentified patent and that said Letters Patent is hereby corrected as shown below:

COLUMN 2

Line 30, "cross sectional" should read --cross-sectional--.

COLUMN 3

Line 19, "the" (first occurrence) should be deleted.

COLUMN 6

Line 19, "by;" should read --by:--.
    Line 21, "(3)" should read --(2)--.
    Line 57, "of" should read --for--.

COLUMN 7

Line 14, "beam," should read --beams,--.

Signed and Sealed this

Fifth Day of March, 1996

*Attest:*

BRUCE LEHMAN

*Attesting Officer*     *Commissioner of Patents and Trademarks*